(12) United States Patent
Glickman

(10) Patent No.: US 8,894,332 B2
(45) Date of Patent: Nov. 25, 2014

(54) METHOD FOR SECURING A MOTOR VEHICLE TO A TRANSPORTER

(71) Applicant: Ford Global Technologies, LLC, Dearborn, MI (US)

(72) Inventor: David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/051,159

(22) Filed: Oct. 10, 2013

(65) Prior Publication Data

US 2014/0064869 A1 Mar. 6, 2014

Related U.S. Application Data

(62) Division of application No. 12/835,889, filed on Jul. 14, 2010, now Pat. No. 8,579,564.

(51) Int. Cl.
*B60P 7/08* (2006.01)
*B60P 3/077* (2006.01)
*B60T 3/00* (2006.01)

(52) U.S. Cl.
CPC .. *B60P 3/077* (2013.01); *B60T 3/00* (2013.01)
USPC ................................................ 410/30; 410/7

(58) Field of Classification Search
CPC ............ B60P 3/06; B60P 3/073; B60P 3/075; B60P 3/077; B60P 3/079; B60P 7/083; B60P 7/0838; B60P 7/0892; B60T 3/00
USPC ................ 410/30, 7, 10, 11; 188/32, 36, 4 R; 211/20–24
See application file for complete search history.

(56) References Cited

U.S. PATENT DOCUMENTS 3,219,152 A * 11/1965 Castellani et al. .............. 410/66
4,923,346 A    5/1990 Hager
7,581,623 B1   9/2009 Egnor

* cited by examiner

*Primary Examiner* — Stephen Gordon
(74) *Attorney, Agent, or Firm* — Raymond L. Coppiellie; Brooks Kushman P.C.

(57) ABSTRACT

A method for transporting a vehicle having a wheel and a flexible underbody component, such as an air dam or skirt, adjacent the wheel. A chock including at least one wheel positioning bump is placed on a deck of the transporter vehicle (railway car, road vehicle, ship, aircraft, etc.) with the bump projecting upwardly from the deck to contact the wheel when the vehicle is in a pre-tie-down position. The chock further includes a sloped portion extending from positioning bump(s) to be located between the flexible underbody component and the deck. As the vehicle is urged downwardly to a tied-down position, the flexible underbody component contacts the sloped portion and is deflected either away from or toward the wheel to protect it from damaging contact with the deck.

5 Claims, 2 Drawing Sheets

METHOD FOR SECURING A MOTOR VEHICLE TO A TRANSPORTER

CROSS-REFERENCE TO RELATED APPLICATIONS

This application is a division of U.S. application Ser. No. 12/835,889 filed Jul. 14, 2010, and issued as U.S. Pat. No. 8,579,564 B2 on Nov. 12, 2013, the disclosure of which is hereby incorporated in its entirety by reference herein.

TECHNICAL FIELD

Embodiments of the present invention relate to a device and method for protecting a wheeled vehicle from damage when being shipped aboard a transporting vehicle.

BACKGROUND

Motor vehicles such as passenger cars, minivans, trucks, etc., are often shipped or transported from their point of manufacturer to their point of sale (or other intermediate depot) aboard transporter vehicles such as railway cars, car-hauler trucks, ships, barges, and aircraft. During shipping, the motor vehicles are typically secured to the transporter by tie-down chains, cables, or straps. The motor vehicle being shipped is driven onto a generally horizontal deck of the transporter, the tie-down members are attached to anchor points on the deck and on the vehicle, and the tie-down members are tightened to draw the vehicle downwardly toward the deck, compressing the motor vehicle's suspension and thereby firmly restraining the vehicle against undesired motion relative to the conveyance. This tie-down process may reduce the vertical clearance between the lowermost extent of the vehicle underbody and the deck by several inches in comparison with a normal driving configuration of the vehicle.

Many motor vehicles feature aerodynamic devices that extend downwardly from the vehicle underbody to improve vehicle aerodynamic performance, and thereby fuel efficiency. Examples of such aerodynamic devices are numerous, and include front air dams, side skirts, and similar appendages. Such aerodynamics devices are commonly formed of plastic or plastic-composite materials and are designed to be somewhat flexible in order to be resistant to permanent deformation or other damage if they are struck by debris or obstacles on the roadway.

To achieve the maximum amount of improvement in fuel efficiency, it is generally advantageous for an aerodynamic underbody component to extend downwardly as close to the roadway surface as possible when the vehicle is in motion. During shipping of vehicles with low-clearance underbody components, it has been found that the tie-down process described above may cause the underbody component to contact the deck of the transporter. In some cases, this contact may cause damage to the underbody component if the component does not deflect either forwardly or rearwardly in the manner it was designed to operate in normal driving conditions.

SUMMARY

In a first disclosed embodiment, a protective chock for use with a vehicle having a wheel and a flexible underbody component comprises at least one wheel positioning bump for placement on a deck of a transporter vehicle. The bump projects upwardly from the deck to contact the wheel when the vehicle is in a pre-tie-down position on the deck. The chock further comprises a sloped portion extending away from the bump and the wheel to be located between the flexible underbody component and the deck. As the vehicle is urged downwardly to a tied-down position, the flexible underbody component contacts the sloped portion and is deflected either away from or toward the wheel to protect it from damaging contact with the deck.

In another disclosed embodiment, apparatus for securing a vehicle having a wheel and a flexible underbody component to a deck of a transporter vehicle comprises a bump for placement on the deck, the bump projecting upwardly from the deck to contact the wheel when the vehicle is rolled to a pre-tie-down position on the deck. The apparatus further comprises a deflector portion extending from the wheel locating bump to be positioned below the flexible underbody component when the vehicle is in the pre-tie-down position. The deflector makes contact with the flexible underbody component as the vehicle is urged downwardly to a tied-down position and deflects the component away from a normal, at-rest condition and toward a protected position relative to the deck. In the deflected, protected condition, the flexible underbody component is less likely to be damaged during shipping than if the component contacts the deck when the vehicle is tied down.

In another disclosed embodiment, a method of securing a vehicle to a load-carrying deck of a transporter vehicle comprises placing a protective chock on the deck adjacent a spot where a wheel of the vehicle is to be located when the vehicle is in a pre-tie-down position on the deck, rolling the vehicle to the pre-tie-down position wherein the wheel contacts the protective chock and a flexible underbody component adjacent the wheel is located above the protective chock, and urging the vehicle downwardly toward the deck such that a suspension of the vehicle compresses and the flexible underbody component contacts the protective chock and is deflected to a deflected condition.

BRIEF DESCRIPTION OF THE DRAWINGS

Embodiments of the present invention will now be described by way of example only with reference to the accompanying drawings in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
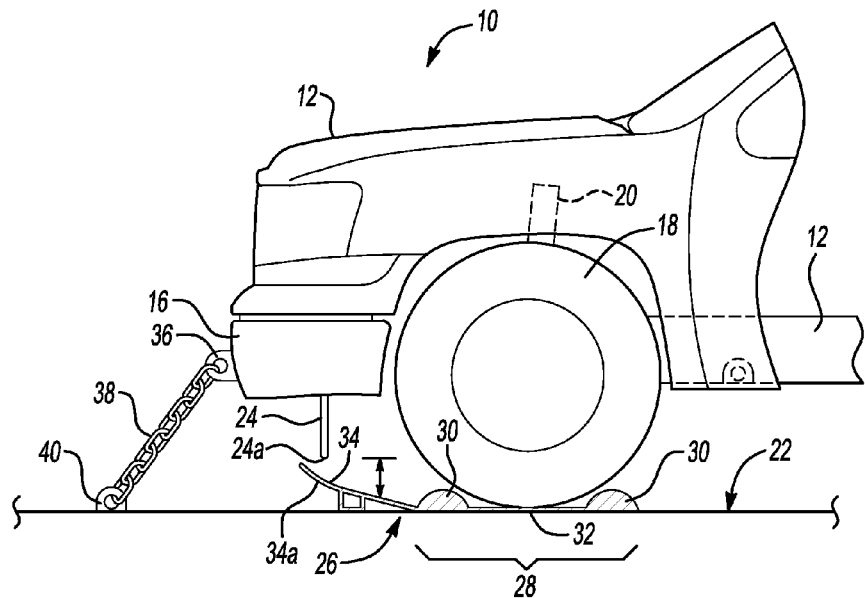
FIG. 1 is a schematic view of a motor vehicle positioned in a pre-tie-down position on a deck of a transporter.

As shown schematically in FIG. 1, a motor vehicle 10 generally comprises a body 12, a frame 14, and a bumper assembly 16. A wheel 18 is connected to the frame 14 by one or more suspension components 20 such as springs, shock absorbers, and/or struts. Vehicle 10 is shown positioned on top of a loading deck 22 on a transporter such as a railway car, car-hauler truck, ship, barge, or aircraft.

Vehicle 10 is provided with an aerodynamic underbody component such as an air dam 24 that may be attached to frame 12, body 12, and/or bumper assembly 16 and extends downwardly such that a lower edge 24a is spaced a desired vertical distance from deck 22 and from a roadway (not shown) during normal operation of the vehicle. Air dam 24 may be made of a relatively flexible plastic or reinforced/composite plastic material having an appropriate combination of strength and flexibility so that the air dam is able to deflect forward and/or rearward from the operative or rest position shown if the air dam strikes an obstacle while the vehicle is in motion.

A protective chock 26 is shown in its operative position positioned on the top surface of deck 22 and beneath wheel 18. Protective chock 26 comprises a wheel locating platform 28 that includes first and second positioning bumps 30 and a spacer 32 connecting the bumps. First and second bumps 30 are spaced from one another by a distance which allows wheel 18 to sit between and be positioned by the bumps when vehicle 10 is rolled into the pre-tie-down position shown in FIG. 1. As such, the exact configuration and dimensions of wheel locating platform 28 are preferably selected to work in proper combination with a wheel 18 of a given size. Chock 26 may be constructed of a high-strength plastic material.

Protective chock 26 further comprises an underbody engagement portion 34 that extends from the wheel locating platform 28 into a position between air dam 24 and deck 22.

A tie-down member 38 is connected between a tie-down fitting 36 on the vehicle and an anchor lug 40 on deck 22. Tie-down fitting 36 is shown to be towing loop and projecting from bumper assembly 16. Tie-down member 38 may be a chain, cable, rope, strap or any suitable type of tension-bearing member. Tie-down member 38 preferably includes a tensioning device (not shown) such as a ratchet, turn-buckle, or lever-lock as is well known in the art. As is well-known in the vehicle transporting industry, at least four tie-down members are generally used to secure a vehicle, with at least one tie-down member being located at each of the four corners of a vehicle.

FIG. 1 shows the vehicle 10 in the pre-tie-down position relative to deck 22 and protective chock 26. The protective chock 26 has first been placed on deck 22 at a spot where the vehicle wheel 18 is expected to be located when the vehicle is in the desired position for shipping. Vehicle 10 is then rolled, driven, pushed, or towed onto wheel locating platform 28 to assume the pre-tie-down position. As vehicle 10 rolls onto wheel location locating platform 28, positioning bumps 30 provide a positive indication of correct positioning of the vehicle relative to protective chock 26. A person driving vehicle 10 is able to feel the wheel 18 passing over the first positioning bump 30, settling into the space between the bumps, and beginning to contact the second bump. In the pre-tie-down position, vehicle 10 is resting on deck 22 just as it would when in a normal driving position on a roadway, such that the vertical clearance between air dam lower edge 24a and deck 22 is the same as the clearance to a flat roadway surface. Underbody engagement portion 34 extends away from wheel 18 in a direction and distance sufficient to position a distal end 34a beyond the air dam lower edge 24a.

Figure 2:
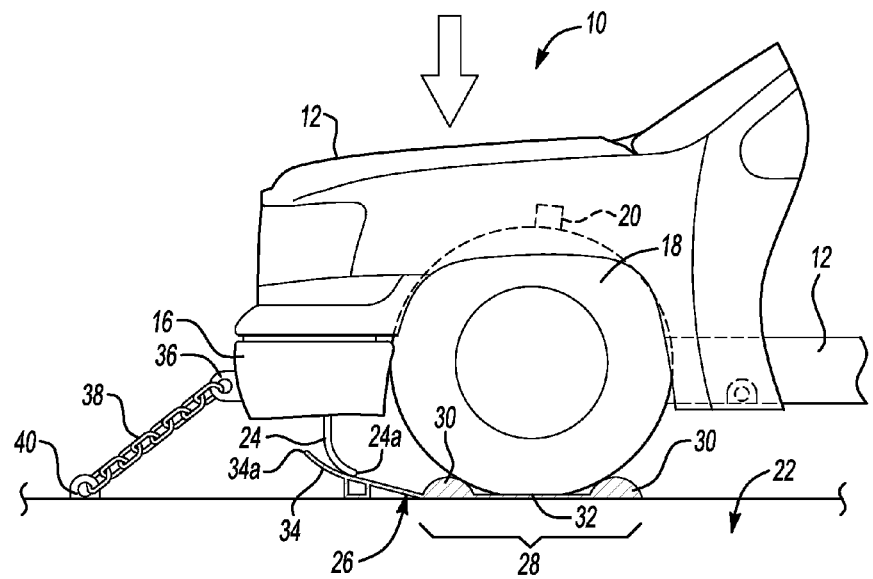
FIG. 2 shows the vehicle of FIG. 1 in the tied-down position.
Figure 3:
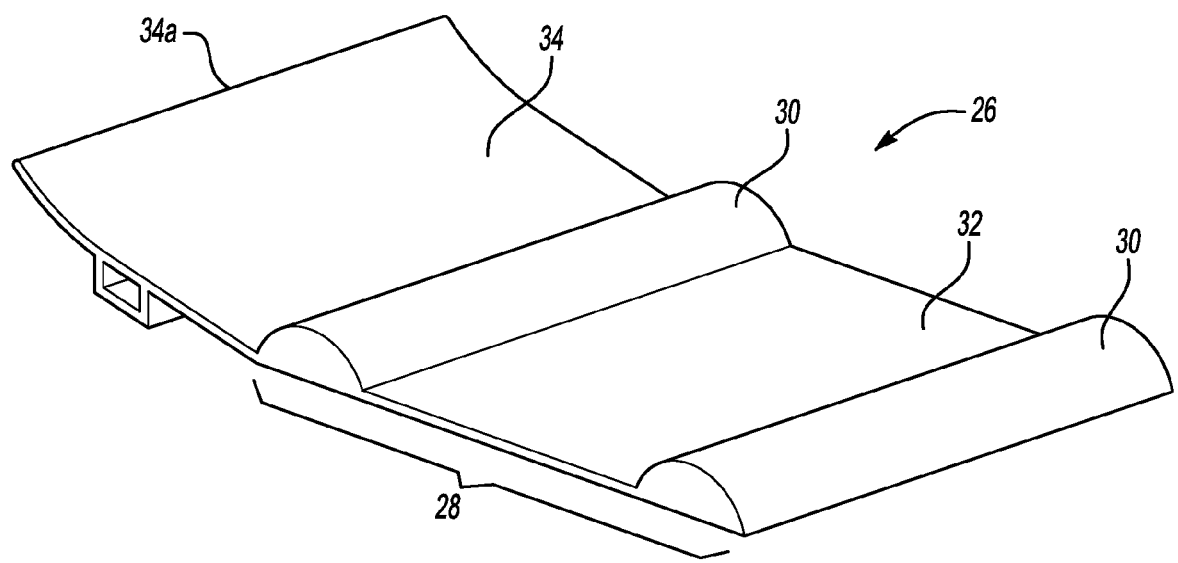
FIG. 3 is a schematic perspective view of a protective chock as used FIGS. 1 and 2.

As seen in FIG. 2, tie-down member 38 (along with the other tie-down members, not shown) is tightened to draw vehicle 10 downwardly toward deck 22, compressing suspension components 20 related to wheels 18. As vehicle 10 is urged downwardly during the tie-down process, air dam lower edge 24a contacts the upper surface of underbody engagement portion 34 and the sloped or inclined upper surface of the underbody engagement portion deflects the air dam toward wheel 18.

Protective chock 26 may be configured to prevent any contact between air dam 24 and deck 22 during shipping. This may be expected to reduce the likelihood of damage to the chock that may be caused by normal vibration during shipping, since chock 26 may be made from a smooth, non-marring material.

Air dam 24 may include an engineered hinge 24b for allowing the air dam to deflect in a predictable manner if the air dam strikes a roadway obstacle. Engineered hinge 24 may be a living hinge, a line of a reduced cross section extending generally horizontally across the lateral width of the air dam, or may be a s-shaped section. If an engineered hinge 24b is present, the air dam 24 will fold or deflect primarily about the hinge as shown in FIG. 2.

Protective chock 26 thereby prevents air dam 24 from being crushed, buckled or otherwise damaged by direct contact with deck 22 during the tie-down process. This allows a vehicle having underbody components that extend downwardly in close proximity to a roadway to be transported in a securely tied-down position on a conventional conveyance.

While the portion of vehicle 10 shown in the figures is generally depicted as being a front end of a vehicle having a front air dam 24, it is to be understood that a protective chock as disclosed herein may be used at any wheel position of a vehicle (front, rear, left, right) in order to protect against damage to any underbody component located anywhere on a vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of securing a vehicle to a transporter deck, the method comprising:
   placing a chock on the deck;
   rolling the vehicle to a pre-tie-down position wherein a vehicle wheel contacts the chock and an aerodynamic underbody component of the vehicle is spaced above the chock; and
   tightening a tie-down member attached to the deck and to the vehicle to compress a vehicle suspension until the underbody component contacts the chock and is deflected to a protected position.

2. The method according to claim 1 wherein the tie-down member is a chain.

3. The method according to claim 1 wherein the step of rolling the vehicle to the pre-tie-down position comprises positioning the wheel between first and second wheel positioning bumps.

4. The method according to claim 3 wherein the step of rolling the vehicle to the pre-tie-down position comprises positioning the wheel on top of spacer connecting the first and second wheel positioning bumps.

5. A method of securing a vehicle to a transporter deck comprising:
- placing a chock on the deck;
- rolling the vehicle onto the deck such that a vehicle wheel contacts the chock and an aerodynamic underbody component extending downward from a vehicle body is above and spaced from the chock; and
- urging the vehicle body downward to compress a vehicle suspension until the underbody component contacts the chock and is deflected thereby.

* * * * *